United States Patent [19]

Trakas

[11] Patent Number: 4,562,481
[45] Date of Patent: Dec. 31, 1985

[54] OVERLAY FOR CATHODE RAY TUBE DISPLAY

[76] Inventor: Theodore C. Trakas, 7407 Meadow Cliff, San Antonio, Tex. 78251

[21] Appl. No.: 430,935

[22] Filed: Sep. 30, 1982

[51] Int. Cl.$^4$ .............................................. H04N 5/72
[52] U.S. Cl. .................................... 358/252; 358/253
[58] Field of Search ............... 358/231, 247, 250, 251, 358/252, 253; 350/276–282; 313/474

[56] References Cited

U.S. PATENT DOCUMENTS

| | | | |
|---|---|---|---|
| 2,473,825 | 6/1949 | Smith | 88/61 |
| 2,655,452 | 10/1953 | Barnes et al. | 106/52 |
| 3,632,873 | 1/1972 | Henkin | 358/250 |
| 4,045,818 | 8/1977 | Wilhelm | 358/245 |
| 4,132,919 | 1/1979 | Maple | 358/252 |
| 4,204,231 | 5/1980 | Permenter | 358/247 |

*Primary Examiner*—John C. Martin
*Assistant Examiner*—Edward L. Coles
*Attorney, Agent, or Firm*—McCamish, Ingram, Martin & Brown

[57] ABSTRACT

The disclosed CRT overlay, which is mounted to the display face of a CRT, comprises an overlay panel (typically a non-glare optical filter) mounted at its edges to the CRT display face and a layer of transparent glass beads interposed between the overlay panel and the CRT display face. The glass beads maintain a thin (in the range of 0.005 inches or less) gap between the overlay panel and the display face, such that display clarity is substantially unaffected by the mounting of the overlay panel. The use of the glass beads enables the overlay panel to be mounted without a relatively expensive bonding process, while at the same time avoiding the display clarity degredation associated with currently employed air-gap mounting techniques.

6 Claims, 3 Drawing Figures

OVERLAY FOR CATHODE RAY TUBE DISPLAY

BACKGROUND OF THE INVENTION

The present invention is directed to cathode ray tube display screens, and more particularly to an overlay (such as an optical filter) for CRT display face.

CRT display screens commonly comprise an optical filter overlay panel mounted in laminal relation to the glass display face of the CRT. The purpose of the filter overlay panel is to reduce glare and to enhance contrast (in addition, the filter can be colored to adjust the phosphor colors of the CRT to achieve a desired color display). Typically, the overlay panel is formed of semi-rigid plastic with a glare-reducing matt finish, corresponding in contour to the CRT display face.

Two principal techniques are used to secure the filter overlay panel to the CRT display face. In one technique, the filter panel is bonded directly to the display face using a clear bonding agent, forming a laminate display screen. In the other technique, the filter panel is secured at its perimeter to the CRT such that an air gap remains between the filter panel and the CRT display face; the air gap is required to avoid optical distortion due to intermittent point contact between the filter panel and the display face.

Both of these mounting techniques provide CRT display screens (display face plus mounted filter panel) having a number of disadvantages. In the bonding procedure, care must be taken to insure uniform spacing between the filter panel and the display face to prevent differential thermal expansion and contraction resulting in separation (a number of techniques have been devised to insure such a uniform separation, for example, U.S. Pat. No. 4,204,231 to Permenter). Also, despite the use of a clear bonding agent, undesireable attenuation can occur, thereby reducing screen brightness. Indeed, because the adhesive must bond both to the glass display face and the plastic overlay panel, the choice of a proper adhesive makes it difficult to maximize adhesive transparency, further degrading optical transmission. Further, with respect to the non-bonding technique, the bonding procedure introduces significant additional manufacturing costs. Regarding the non-bonding technique, to insure that a gap is maintained across the entire surface of the display face, manufacturing tolerances require that the gap at the edges of the filter panel where it is mounted to the CRT display face be on the order of 0.031–0.062 inches (typically, this gap is maintained using double sided adhesive tape of a corresponding thickness); disadvantageously, a gap of this magnitude significantly decreases screen contrast and display clarity. Moreover, later CRT assembly procedures may adversely affect the gap spacing between the overlay panel and the display face. Thus, while this mounting technique for a filter panel involves significantly reduced manufacturing costs by avoiding the bonding procedure, in many applications the degredation in display clarity makes its use undesirable.

SUMMARY AND OBJECTS OF THE INVENTION

Summary

The present invention provides a laminate overlay for the display face of a CRT comprising (a) an overlay panel (such as an optical filter) which corresponds in contour to the CRT display face, and (b) a layer of transparent particles of a predetermined size interposed between the overlay panel and the CRT display face. Preferably, the particles are distributed evenly throughout the space between the overlay panel and the CRT display face such that, when the overlay panel is mounted to the display face, a uniform gap corresponding to the size of the particles is insured.

For a preferred embodiment, the transparent particles comprise solid glass beads that are commercially available from a number of sources. These glass beads have a diameter in the range of 0.005 inches or less, appearing in bulk form as a powder. This glass bead powder can be dusted over the surface of either the display face or the overlay panel to provide an even distribution prior to mounting.

Objects

From the foregoing, a general object of the present invention is to provide an overlay for the display face of a CRT such that a consistently narrow gap can be maintained between the display face and an overlay panel without the necessity of an intermediate bonding procedure, and without causing any significant degredation in display clarity. To that end, specific objects of the present invention include providing such an overlay for a CRT display face that:

(a) Is adaptable for use with either pliable (extra thin), semi-rigid or rigid overlay panels;
(b) Is adaptable to mounting an optical filter overlay panel to a CRT display face so as to reduce glare;
(c) Is relatively unaffected by normal temperature and humidity cycling;
(d) Results in a minimum of optical attenuation; and
(e) Can be assembled without using an intermediate bonding procedure that increases manufacturing costs.

These and other objects will be apparent to those of ordinary skill in the art having knowledge of this specification, the drawings and the appended claims.

BRIEF DESCRIPTION OF THE DRAWINGS

A more complete understanding of the present invention can be had by reference to the following detailed description of a preferred embodiment when considered in conjunction with the accompanying drawings in which.

PREFERRED EMBODIMENT OF THE INVENTION

Figure 1:
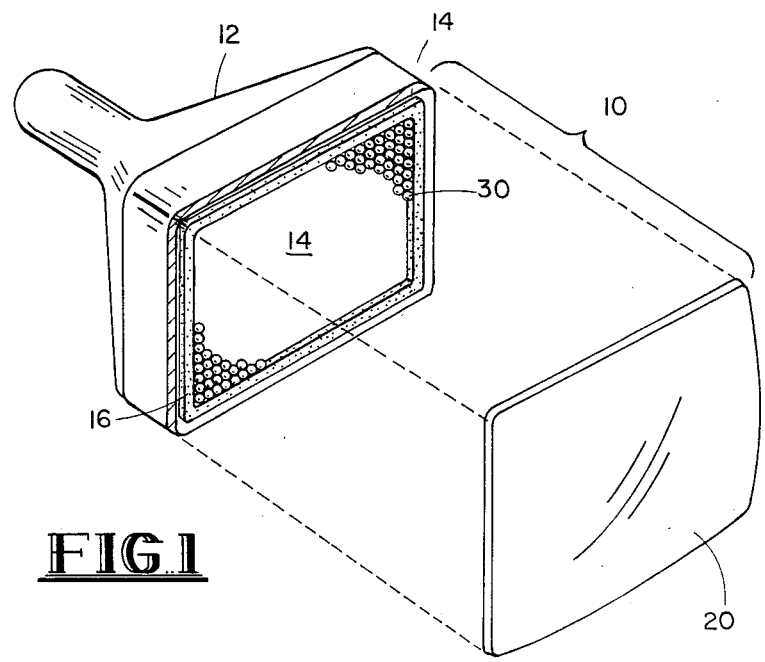
FIG. 1 is a perspective exploded view showing a CRT and an overlay panel.
Figure 2:
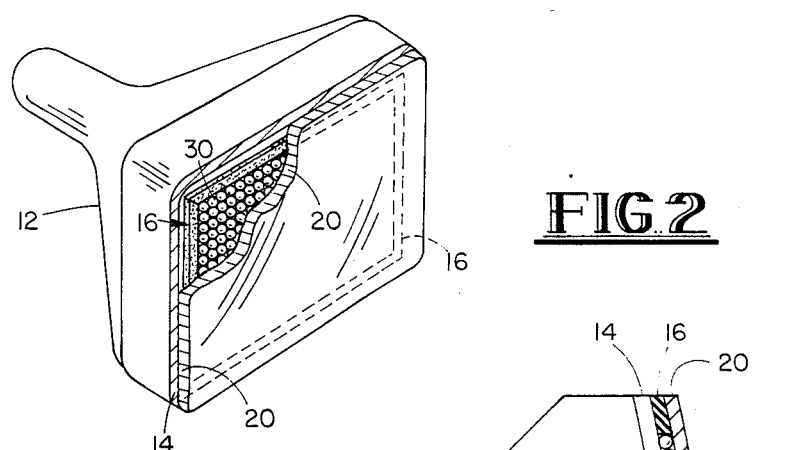
FIG. 2 is a perspective view of a CRT having a display screen that includes a mounted overlay panel with a portion of the overlay panel being cut away to reveal the interposed transparent particles (shown as hatch shading)
Figure 3:
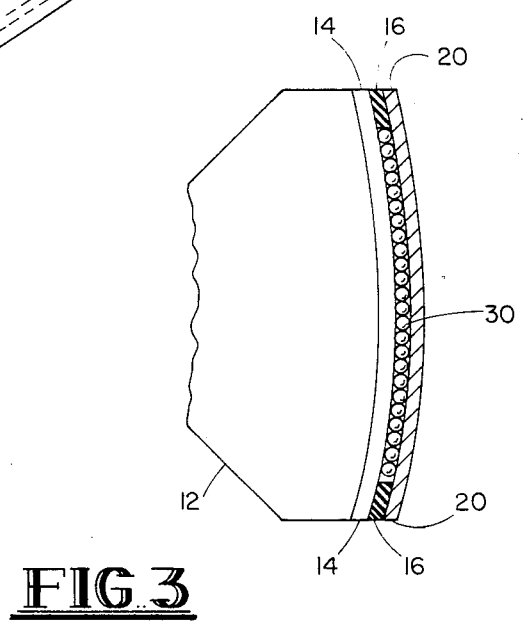
FIG. 3 is a cross-sectional view of the CRT display screen according to the present invention showing the CRT display face and the overlay panel with the interposed, transparent particles.

The preferred embodiment of the present invention is described in relation to providing an optical filter overlay for a cathode ray tube. The overlay comprises a filter panel and a layer of transparent particles of a predetermined size interposed between the filter panel and the CRT display face. Of course, the present invention can be used in providing any overlay in which a narrow, well defined gap must be maintained between an overlay panel and a mounting face.

As shown in the drawings, a display screen 10 for a CRT 12 comprises an exterior display face 14 of the CRT to which is mounted a filter panel 20. Typically, filter panel 20 is formed of a semi-rigid plastic or plastic laminate sheet corresponding in contour to display face 14, and exhibiting a glare-reducing matt finish. Alternatively, either a rigid or a pliable (e.g., extra thin) overlay panel may be used. The filter panel may be colored to adjust the phosphor colors of the CRT to achieve a desired color display.

Filter panel 20 is mounted to display face 14 and secured at its edges in a manner that is not critical to the present invention; the preferred technique is to use thin (approximately 0.005 inches or less) adhesive transfer strips 16 placed at the edges of the display face. Interposed between filter panel 20 and display face 14 is a layer of substantially spherical, transparent glass particles 30 (either solid beads or bubble-shaped). Prior to mounting filter panel 20, glass particles 30 are evenly distributed over either display face 14 or the contact surface of the filter panel 20 (electrostatic forces cause the particles to adhere to a contact surface during mounting). After mounting filter panel 20 to display face 14 by securing its edges, the interposed glass particles maintain a uniform gap corresponding to the size of the particles.

Particle size is not critical to the present invention, but should be small enough to insure that significant degredation does not occur in display clarity, and large enough to provide a minimum gap of between 50 and 100 times the CRT display phosphor wave length to avoid the formation of Newtoniam interference rings. Glass particles 30 are commercially available in preselected sizes. For example, CRT screens including filter overlays have been assembled using solid glass beads substantially spherical in shape manufactured by Potter Industries (Spheriglass #3000–45 micron).

Assembly

The assembly method to mount the filter overlay (filter panel 20 and glass particles 30) is not critical to the present invention. For a preferred embodiment, CRT display face 14 and panel 20 are first prepared for mounting by cleaning their respective contact surfaces (such as by using a commercially available glass cleaner). Next, thin strips of transfer adhesive tape 16 of a predetermined thickness (on the order of 0.005 inches or less) are secured to the edges of display face 14 such that, when overlay panel 20 is mounted to the display face, it will be secured at its edges by the adhesive tape. The adhesive tape provides a partial hermetic seal that guards against adverse effects of temperature and humidity cycling, although such effects should be minimal in a normal office environment.

Alternative means of mounting filter panel 20 to display face 14 are readily adaptable to the present invention. For example, a double-sided adhesive foam tape or a suitable silicon or other type adhesive may be used, or the overlay panel may be directly clamped to the CRT. A silicon-type adhesive is preferred if a complete hermetic seal between CRT display face 14 and filter panel 20 is desired to prevent possible adverse effects in applications where extreme temperature and/or humidity cycling is expected.

After display face 14 and filter panel 20 are prepared for mounting, a small, premeasured amount of glass particles or beads 30 is applied to the inner-contact surface of the filter panel and spread (such as by dusting with a brush or wiping with cheese cloth) so as to distribute the particles across the filter panel contact surface. After spreading, filter panel 20 may be inverted or raised to the vertical and lightly tapped to remove excess particles. Filter panel 20 is then mounted to display face 14 by securing its edges to the adhesive transfer tape 16 around the display face perimeter. In this manner, filter panel 20 is secured to display face 14 with the interposed glass particles 30 maintaining a predetermined, uniform gap. The size of this gap is determined by the choice of size for the glass particles, being small enough to prevent any significant degradation in display clarity and large enough to prevent the formation of Newtoniam rings or other optical distortions.

In normal applications, the contact pressure between display face 14 and filter panel 20, and between the individual particles 30 should be sufficient to prevent any settling out or bunching. However, where filter panel 20 is particularly rigid, or where the CRT might be subjected to vibration or severe temperature cycling, fixing particles 30 in place may be advisable. A number of suitable fixing procedures are available including (a) treating the contact surface of filter panel 20 with a thin (relative to particle diameter) layer of heat activated adhesive prior to spreading the glass particles, (b) coating the particles after spreading with a thin layer of clear (plastic) material such as kylon, and (c) coating either display face 14 or the contact surface of filter panel 20 with a thin layer of soft material into which the glass particles will become partially embedded under pressure after mounting.

Conclusion

The display screen overlay of the present invention has been described in relation to a preferred optical filter overlay panel mounted to a CRT display face, with a layer of glass beads (on the order of 0.005 inches or less in diameter) being used to maintain a predetermined gap across the facing surfaces of the CRT display face and the filter panel. The resulting CRT display screen provides good resolution, contrast and display clarity. The use of the glass particles to maintain a gap between the CRT display face and the filter panel insures uniform separation so as to prevent degradation of display clarity, while avoiding the manufacturing cost of providing a bonding agent to laminate the filter panel to the display face. The resulting display screen—CRT display face plus mounted overlay—exhibits minimal light attenuation and a good resistance to the effects of temperature and humidity cycling.

While the invention has therefore been described in relation to a preferred embodiment, those of ordinary skill in the art understand that the invention is not so limited, but rather that the limits of the invention are interpreted only in conjunction with the appended claims.

The embodiments of the invention in which an exclusive property or privilege is claimed are as follows:

1. An overlay for the display face of a CRT comprising:
   (a) An overlay panel conforming in contour to the CRT display face, and disposed in laminal, spaced relation to the display face;
   (b) Transparent, rigid, substantially spherical particles of a predetermined size interposed between said overlay panel and the CRT display face such that a substantially uniform gap is maintained between them; and (c) Means for securing the edges of said overlay panel to the CRT display face.

2. A CRT overlay as defined in claim 1 wherein said transparent particles are of substantially spherical shape.

3. A CRT overlay as defined in claim 2 wherein said overlay panel comprises an optical filter having a glare-reducing exterior matt finish.

4. A CRT overlay as defined in claim 3 wherein said transparent particles comprise glass substantially spherically shaped beads.

5. A CRT overlay as defined in claim 4 wherein said securing means comprises strips of double-sided adhesive secured adjacent the edges of either said overlay panel or the CRT display face.

6. A CRT overlay as defined in claim 5 wherein said glass spheres are substantially the same as Spheriglass #3000 glass beads (45 micron) manufactured by Potter Industries.

* * * * *